United States Patent
Hodges

(10) Patent No.: US 8,352,904 B2
(45) Date of Patent: Jan. 8, 2013

(54) EARLY DEFECT REMOVAL MODEL

(75) Inventor: Brent Hodges, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1233 days.

(21) Appl. No.: 12/144,889

(22) Filed: Jun. 24, 2008

(65) Prior Publication Data

US 2009/0319984 A1 Dec. 24, 2009

(51) Int. Cl.
G06F 9/44 (2006.01)
G06F 11/00 (2006.01)

(52) U.S. Cl. .................. 717/101; 717/125; 714/38.1

(58) Field of Classification Search ............... None
See application file for complete search history.

(56) References Cited

U.S. PATENT DOCUMENTS

| | | | |
|---|---|---|---|
| 6,477,471 B1 * | 11/2002 | Hedstrom et al. | 702/34 |
| 6,901,535 B2 * | 5/2005 | Yamauchi et al. | 714/38.12 |
| 7,228,524 B2 | 6/2007 | Bailey et al. | |
| 7,234,131 B1 * | 6/2007 | Speyrer et al. | 717/101 |
| 7,337,124 B2 * | 2/2008 | Corral | 705/7.17 |
| 7,386,831 B2 * | 6/2008 | Flanagan | 717/103 |
| 7,401,321 B2 * | 7/2008 | Sit et al. | 717/125 |
| 7,614,043 B2 * | 11/2009 | Ognev et al. | 717/126 |
| 7,757,125 B2 * | 7/2010 | Bassin et al. | 714/38.1 |
| 7,774,743 B1 * | 8/2010 | Sanchez et al. | 717/103 |
| 7,856,616 B2 * | 12/2010 | Chang et al. | 717/101 |
| 7,917,897 B2 * | 3/2011 | Bassin et al. | 717/131 |
| 2003/0115570 A1 | 6/2003 | Bisceglia | |
| 2004/0128653 A1 * | 7/2004 | Arcand | 717/124 |
| 2004/0205727 A1 * | 10/2004 | Sit et al. | 717/125 |
| 2005/0071807 A1 * | 3/2005 | Yanavi | 717/104 |
| 2005/0144592 A1 * | 6/2005 | Below et al. | 717/124 |
| 2005/0193269 A1 * | 9/2005 | Haswell et al. | 714/38 |
| 2005/0283751 A1 * | 12/2005 | Bassin et al. | 717/100 |
| 2005/0289503 A1 * | 12/2005 | Clifford | 717/101 |
| 2006/0010428 A1 * | 1/2006 | Rushby et al. | 717/124 |
| 2006/0041857 A1 * | 2/2006 | Huang et al. | 717/104 |

(Continued)

OTHER PUBLICATIONS

Troster et al., "Exploratory Analysis Tools for Tree-Based Models in Software Measurement and Analysis", @ 1996 IEEE Proceedings of SAST '96, retrieved from <http://ieeexplore.ieee.org/stamp/stamp.jsp?tp=&arnumber=506473>, total pp. 7-17.*

(Continued)

*Primary Examiner* — Don Wong
*Assistant Examiner* — Marina Lee
(74) *Attorney, Agent, or Firm* — Cantor Colburn LLP; Louis Percello

(57) ABSTRACT

A method and a computer program product for modeling early defect removal are provided. The method includes selecting a first set of software development practices to model as a baseline plan, where each of the software development practices has an associated defect removal efficiency (DRE) and is associated with a development phase of a software development cycle. The method also includes selecting a second set of the software development practices to model as a to be plan, where each of the software development practices has a configurable DRE for the to be plan. The method further includes calculating defect removal in each of the development phases as a function of the DRE values, adjusting configuration settings for the to be plan to shift an amount of the defect removal earlier in the development phases of the to be plan as compared to the baseline plan, and outputting a graphical representation.

7 Claims, 4 Drawing Sheets

U.S. PATENT DOCUMENTS

| | | |
|---|---|---|
| 2006/0074725 A1 | 4/2006 | Huang et al. |
| 2006/0129978 A1 | 6/2006 | Abrari et al. |
| 2006/0129994 A1 | 6/2006 | Srivastava et al. |
| 2006/0265188 A1* | 11/2006 | French et al. .................. 702/185 |
| 2007/0074149 A1* | 3/2007 | Ognev et al. .................. 717/101 |
| 2008/0201611 A1* | 8/2008 | Bassin et al. .................... 714/37 |
| 2008/0201612 A1* | 8/2008 | Bassin et al. .................... 714/38 |
| 2009/0319984 A1* | 12/2009 | Hodges ......................... 717/105 |
| 2010/0251027 A1* | 9/2010 | Yawalkar et al. ............... 714/38 |

OTHER PUBLICATIONS

Watson et al. "Structured Testing: A Testing Methodology Using the Cyclomatic Complexity Metric" NIST special Publication, 1996—idldoc.idldev.com, total pp. 124.*

* cited by examiner

EARLY DEFECT REMOVAL MODEL

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer-based software development planning, and particularly to an interactive early defect removal model to compare baseline development practices to alternate practices.

2. Description of Background

As large-scale software development projects are created with tens of thousands of lines of code, numerous defects can be unintentionally injected along the way. The defects can be injected in various stages of development, such as requirements generation, design, and coding. Defects discovered later in the development cycle are typically associated with greater expense, since a large amount of work may be required to correct the defects, retest and verify the corrected product. Proper scheduling is critical to control costs and meet target completion dates. With large development teams, the impact of delays associated with longer development time is amplified as additional man months of labor can be added to the total development cost of the product.

Organizations that develop software typically follow a standardized development model and create project specific development plans based upon the standard model. Planning resource allocation may be based upon historical data from past projects that followed the same standard model. This approach can provide relatively predictable results that may include limited incremental improvement, but it does not lend itself to significant improvement over past performance results.

SUMMARY OF THE INVENTION

The shortcomings of the prior art are overcome and additional advantages are provided through the provision of a method for modeling early defect removal. The method includes selecting a first set of software development practices to model as a baseline plan, where each of the software development practices has an associated defect removal efficiency (DRE) and is associated with a development phase of a software development cycle. The method also includes selecting a second set of the software development practices to model as a to be plan, where each of the software development practices has a configurable DRE for the to be plan. The method further includes calculating defect removal in each of the development phases for the baseline plan and the to be plan as a function of the DRE values. The method additionally includes adjusting configuration settings for the to be plan to shift an amount of the defect removal earlier in the development phases of the to be plan as compared to the baseline plan, and outputting a graphical representation of effects of the to be plan as compared to the baseline plan.

A computer program product corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECT

As a result of the summarized invention, technically a solution has been achieved which graphically illustrates effects of modifying software development practices as compared to a baseline model and supports both user interaction and customization. Outputs can include schedules and plans to manage resources for developing software while targeting early removal of defects from the software.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
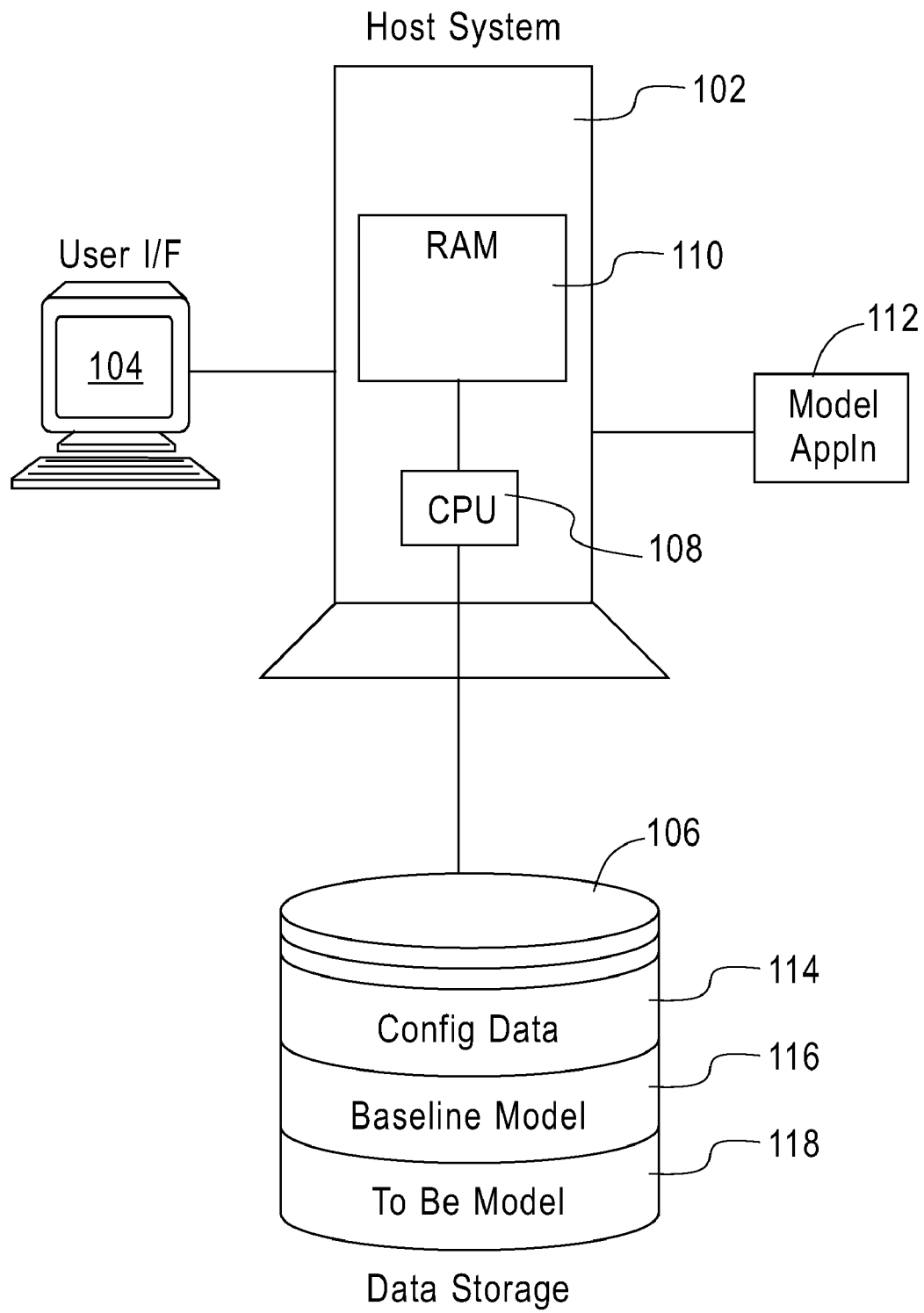
FIG. 1 depicts an example of a computer system for executing an early defect removal model.

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods and computer program products for an early defect removal model. In exemplary embodiments, the early defect removal model enables users to configure various development attributes based on industry data or modified estimates to produce scenarios for customizing software development plans in terms of manpower, scheduling, and budgeting. Keying on removal of defects as a schedule and cost driver, the early defect removal model supports plan adjustments to include testing, analysis, and inspection at various points in a planned software development lifecycle, allowing users to view the expected impact to cost and manpower allocation relative to a baseline plan. Customization can be performed to adjust efficiency of defect removal for each practice to fine tune planning. For example, if code inspection is not typically performed as part of standard software development practice, developers may be less efficient at using code inspection to remove defects as compared to developers with more code inspection experience.

The early defect removal model can be used to visualize and adapt development plans to remove defects early in the development cycle. In exemplary embodiments, the early defect removal model outputs a modified schedule with resource allocation, projected defects injected per development phase, and expected number of defects to be removed per development phase for an entire software development cycle from requirement generation through coding, testing, and support in the field. Real-world schedules are often built without allocation of sufficient time to find and remove defects during earlier stages of development. Through quantifying expected numbers of defects injected and removed, as well as cost and manpower associated with the activities, development plans can be crafted to increase removal of defects earlier in the development cycle while lowering total development cost and often shortening the schedule.

The inclusion of practices such as document and code inspections, unit testing, and static analysis can result in an overall savings of resources and schedule for a project under development. To fully take advantage of these savings, the project development schedule is modified to allocate more time and resources to early development stages and less time and resources to the later test stages. Managers and developers may have difficulty in appreciating that taking additional time during the development phases often shortens the overall time needed to complete a project. Without the ability to quantify the effects of various changes to a baseline plan, it can be counter-intuitive that taking longer earlier leads to taking even less time later. Conversely, skipping certain verification, analysis, and inspection steps earlier can lead to lengthening the overall project schedule. However, when faced with schedule pressure development teams may skip early steps if there is no means to quantify the potential impact of such actions.

Turning now to the drawings, it will be seen that in FIG. 1 there is a block diagram of a system 100 for modeling early defect removal in a software development process that is implemented in accordance with exemplary embodiments. The system 100 of FIG. 1 includes a host system 102 in communication with a user interface 104 and a data storage device 106. The host system 102 may be any type of computer system known in the art. For example, the host system 102 can be a desktop computer, a laptop computer, a general-purpose computer, a mainframe computer, or an embedded computer (e.g., a computer within a wireless device). In exemplary embodiments, the host system 102 executes computer readable program code. While only a single host system 102 is shown in FIG. 1, it will be understood that multiple host systems can be implemented, each in communication with one another via direct coupling or via one or more networks. For example, multiple host systems 102 may be interconnected through a distributed network architecture. The single host system 102 may also represent a server in a client-server architecture.

In exemplary embodiments, the host system 102 includes at least one processing circuit (e.g., CPU 108) and volatile memory (e.g., RAM 110). The CPU 108 may be any processing circuit technology known in the art, including for example, a microprocessor, a microcontroller, an application specific integrated circuit (ASIC), a programmable logic device (PLD), a digital signal processor (DSP), or a multi-core/chip module (MCM). The RAM 110 represents any volatile memory or register technology that does not retain its contents through a power/depower cycle, which can be used for holding dynamically loaded application programs and data structures as a computer-readable storage medium. The RAM 110 may comprise multiple memory banks partitioned for different purposes, such as data cache, program instruction cache, and temporary storage for various data structures and executable instructions. It will be understood that the host system 102 also includes other computer system resources known in the art, and not depicted, such as one of more power supplies, clocks, interfacing circuitry, communication links, and peripheral components or subsystems.

The user interface 104 includes a combination of input and output devices for interfacing with the host system 102. For example, user interface 104 inputs can include a keyboard, a keypad, a touch sensitive screen for inputting alphanumerical information, or any other device capable of producing input to the host system 102. Similarly, the user interface 104 outputs can include a monitor, a terminal, a liquid crystal display (LCD), or any other device capable of displaying output from the host system 102.

The data storage device 106 refers to any type of computer-readable storage medium and may comprise a secondary storage element, e.g., hard disk drive, tape, or a storage subsystem that is internal or external to the host system 102. In alternate exemplary embodiments, the data storage device 106 includes one or more solid-state devices, such as ROM, PROM, EPROM, EEPROM, flash memory, NOVRAM or any other electric, magnetic, optical or combination memory device capable of storing data (i.e., a storage medium), some of which represent executable instructions for the CPU 108. It will be understood that the data storage device 106 shown in FIG. 1 is provided for purposes of simplification and ease of explanation and is not to be construed as limiting in scope. To the contrary, there may be multiple data storage devices 106 utilized by the host system 102.

In exemplary embodiments, the host system 102 executes a model application 112. The host system 102 may also execute other applications, operating systems, and the like. The model application 112 relies on configuration data 114 to develop a baseline model 116 and a "to be" model 118. The configuration data 114 can include project specific configuration data as well as industry data associated with development of various sized projects. For example, the configuration data 114 may include ranges of defects observed normalized over a large number of projects, as well as efficiency information regarding the percentage of defects identified with various inspection, analysis, and testing techniques. The data can be organized by project type or relative complexity and scaled based on the number of modules, lines of code, functions included, or other metrics to derive baseline data. The baseline model 116 can include a combination of customized baseline information for one or more software development projects, and may also include historical data. The to be model 118 includes data associated with a new "to be" plan covering various "what if" scenarios that a user can customize for comparison against the baseline model 116. Although the configuration data 114, baseline model 116, and to be model 118 are depicted separately, it will be understood that they can be aggregated in any combination, including integrated with the model application 112.

Figure 2:
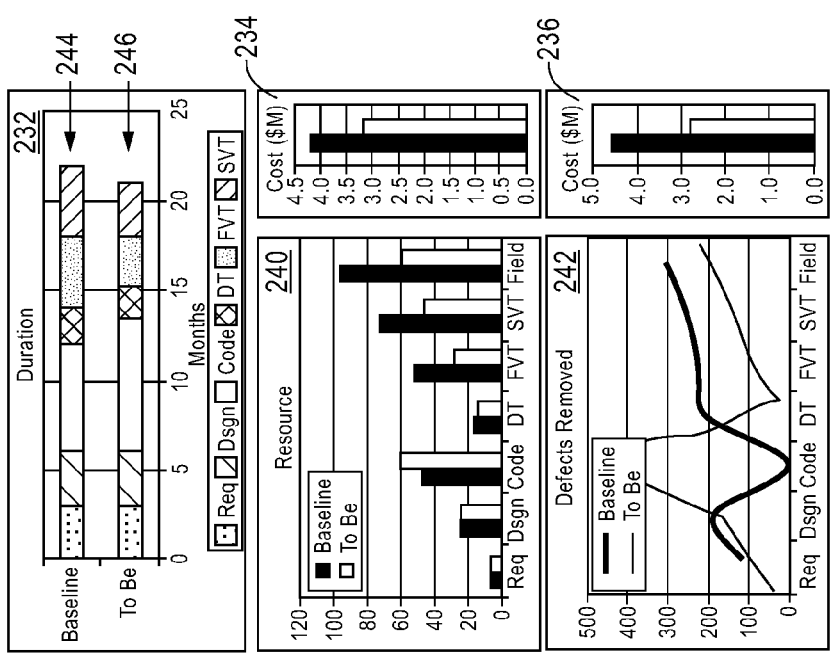
FIG. 2 depicts an example of configuration settings for an early defect removal model.

Turning now to FIG. 2, an example of an interface 200 for adjusting and viewing configuration settings of the model application 112 for modeling early defect removal is depicted. In exemplary embodiments, the interface 200 includes baseline state 202, to be state 204, and configurable settings 206. The data associated with the baseline state 202 can be stored in the baseline model 116, while the data for the to be state 204 are stored in the to be model 118. The baseline state 202 may include data such as phase duration, defects injected, defects removed, defects remaining, and defect removal efficiency. The baseline state 202 may use default values 208, override values 210, or industry data 212. The baseline state 202 may be initialized and modified based on the configuration data 114. Examples of phases of development tracked by the model application 112 include requirement generation 214, design 216, code 218, development test 220, functional verification test 222, system verification test 224, and field support 226. Similar data is established for the to be state 204. Additionally, the to be state 204 can track defects prevented 228. The configuration settings 206 can include configurable data for each phase of development, such as defect cost, weighting, time to remove a defect, percentage of fixed test time, labor costs and business hours per month.

A user of the model application 112 of FIG. 1 can interact with the interface 200 via the user interface 104 of FIG. 1. Adjustments to the configuration settings 206 result in a new plan as illustrated via the to be state 204 relative to the baseline state 202. Differences can be seen in terms of cost savings 230 and graphically depicted by duration graph 232, cost graphs 234 and 236, resource graph 240, and defects removed graph 242. The data in each graph 232-242 is organized relative to baseline versus to be plans, and may be further subdivided for each of the phases 214-226. For example, baseline bar 244 and to be bar 246 illustrate the total impact of each plan in addition to contributions at each development phase. The interface 200 may also include a reset button 248 to set modified values back to default values.

Figure 3:
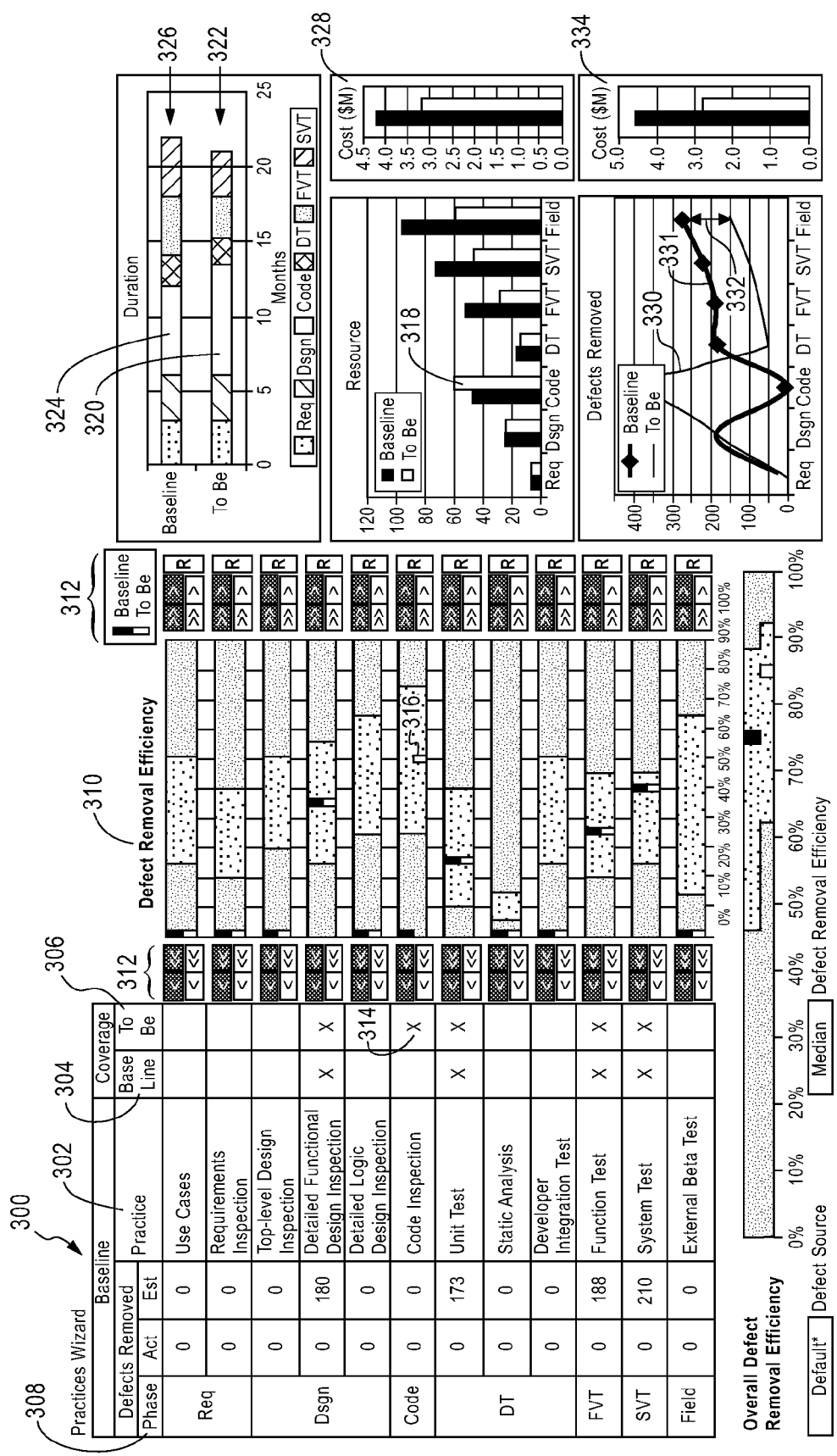
FIG. 3 depicts an example of a practices wizard for adjusting an early defect removal model.

Turning now to FIG. 3, an exemplary practices wizard 300 for adjusting early defect removal settings using the model application 112 of FIG. 1 is depicted in accordance with exemplary embodiments. The model application 112 of FIG. 1 performs a number of calculations to determine the impact of individual practices. For a given practice, the model application 112 calculates the ratio of the number of defects removed by that practice and the total number of defects available for that practice, expressed as a percentage, where the number of defects available is defined as the total number of defects injected during this and all previous phases less all defects removed by all previous practices. The model application 112 also calculates the ratio of the total number of defects removed as a result of all practices and the total number of defects injected, expressed as a percentage. For example, a number of practices 302 can be selected for either the baseline using baseline checkboxes 304 or the new to be plan via to be checkboxes 306. The practices 302 are also grouped by phases 308 that map to the phases 214-226 of FIG. 2. Selecting or de-selecting the baseline checkboxes 304 or the to be checkboxes 306 loads either a median defect removal efficient (DRE) value or zero, respectively, for that given practice, as depicted graphically by DRE indicator 310. Median values may be based on industry data from the configuration data 114 or modified based on historical performance. A user can adjust the DRE values using buttons 312 to fine tune or reset the associated DRE values, e.g., adjust DRE by ±1% or 10%.

As changes are made through user interaction, the results can be both graphically depicted and stored to the data storage device 106 of FIG. 1. For example, setting checkbox 314 selects code inspection for the new to be plan. This in turn sets slider bar 316 to the median DRE value associated with code inspection. The user can perform additional fine tuning of the slider bar 316 position based on other efficiency assumptions, such as the relative experience of the parties performing the code inspection. The additional task of code inspection results in additional resource allocation for coding phase effort in the new to be plan as depicted at resource indicator 318. The scheduling duration for to be code phase 320 is also extended for the new to be plan 322 as compared to baseline code phase 324 for the baseline plan 326. However, the total duration of the new to be plan 322 is reduced relative to the baseline plan 326. This effect is attributable to the relative efficiency of finding defects earlier in the development cycle which reduces time spent in later testing phases to identify and correct the same defects. A further byproduct of the reduced test time is a net savings in resources, expressed as dollars, as illustrated in plot 328. Additionally, the large number of defects found in the new to be plan during the code phase as illustrated at peak 330 results in fewer delivered defects to find in the field (at a customer location) as illustrated by difference 332. This results in an overall net savings as shown in plot 334, based on an estimated cost to remove a defect at each phase of development, e.g., defect cost in the configurable settings 206 of FIG. 2

In an alternate exemplary embodiment, a survey wizard is employed in place of the practices wizard 300. The survey wizard permits the user to answer a set of questions about each practice for both baseline and to be states to calculate an estimated DRE for each phase of development. In this embodiment, the model application 112 of FIG. 1 uses pre-defined weightings for both the questions and the user's answers to estimate the effectiveness of the deployment of each practice. The estimate of effectiveness is expressed as a DRE, that is then used in place of either pre-defined industry data or user customized DREs. For example, the questions may inquire about percentages that specific activities are performed in each stage of development. Detailed examples of specific survey questions are provided in Table 1.

TABLE 1

Example Survey Questions

| No. | Question |
|---|---|
| | Requirements |
| R1 | What percentage of your requirements are formally inspected? |
| R2 | What percentage of your requirements are informally reviewed? |
| R3 | What percentage of your requirements are peer reviewed? |
| R4 | What percentage of your requirements use pair requirement techniques? |
| R5 | What percentage of your requirements are not reviewed? |
| | Design |
| D1 | What percentage of your designs are formally inspected? |
| D2 | What percentage of your designs are informally reviewed? |
| D3 | What percentage of your designs are peer reviewed? |
| D4 | What percentage of your designs use pair design techniques? |
| D5 | What percentage of your designs are not reviewed? |
| | Code |
| C1 | What percentage of your code is formally inspected? |
| C2 | What percentage of your code is informally reviewed? |
| C3 | What percentage of your code is peer reviewed? |
| C4 | What percentage of your code uses pair programming? |
| C5 | What percentage of your code is not reviewed? |

TABLE 1-continued

Example Survey Questions

| No. | Question |
|---|---|
| | Unit Test |
| U1 | What percentage of your mainline code paths are thoroughly unit tested, using either manual unit tests (e.g., dubugger) or automated tests (e.g., Junit)? |
| U2 | What percentage of your exception paths (e.g. error handling or other exceptions) are thoroughly unit tested, using either manual unit tests (e.g., dubugger) or automated tests (e.g., Junit)? |
| U3 | What is your UT coverage target percentage (that is, what percentage of statements or paths should be unit tested)? If you have no target, enter 0. |
| | Static Analysis |
| A1 | On what percentage of your modules do you perform Static Analysis systematically? |
| A2 | Excluding false positives, what percentage of the errors found by Static Analysis are then fixed by development? |
| | FVT |
| F1 | What percentage of your function test cases are derived from a documented FVT strategy? |
| F2 | On what percentage of your functions do you thoroughly exercise boundary, exception, and error conditions? |
| F3 | You have a process to ensure that you find a sufficient percentage of defecs outside the mainline path for what percentage of your functions? |
| F4 | Are FVT testers involved early in the development process, starting with requirements? Answer 0-5: 0 = not addressed, 1 = address minimally, 3 = address adequately, 5 = address very well |
| | SVT |
| | How well do you address each of the following in your system test? Answer 0-5: 0 = not addressed. 1 = address minimally, 3 = address adequately, 5 = address very well (each factor is weighted equally) |
| S1 | Load/Stress |
| S2 | Regression |
| S3 | Recovery |
| S4 | Migration |
| S5 | Usability |
| S6 | Serviceability |
| S7 | Functional Completeness, based on customer-driven use Cases |
| S8 | Hardware and Software interaction |

Figure 4:
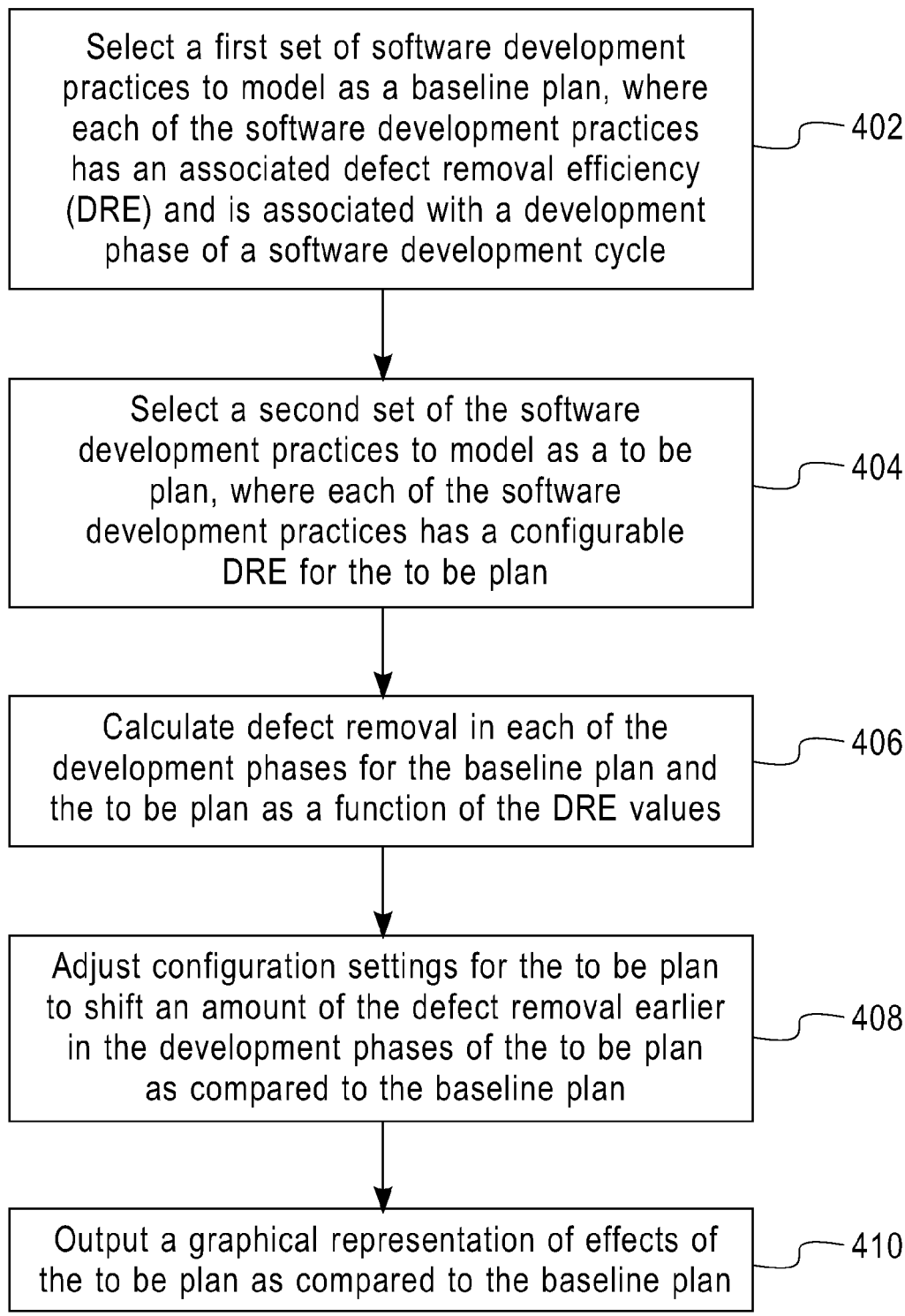
FIG. 4 depicts a process for implementing an early defect removal model in accordance with exemplary embodiments.

Turning now to FIG. 4, a process 400 for modeling early defect removal will now be described in accordance with exemplary embodiments, and in reference to FIGS. 1-3. A user can perform the process 400 interactively through the host system 102 of FIG. 1 via the user interface 104. At block 402, the user of the model application 112 selects a first set of software development practices to model as a baseline plan, where each of the software development practices has a configurable DRE and is associated with a development phase of a software development cycle. At block 404, the user of the model application 112 selects a second set of the software development practices to model as a to be plan, where each of the software development practices has a configurable DRE. For example, using the practices wizard 300, the user can interactively mark the baseline checkboxes 304 to select corresponding practices 302 with an associated DRE shown at DRE indicator 310 and the defects removed profile 331, resulting in baseline schedule 326. The user can make separate selections using the practices wizard 300 to mark the to be checkboxes 306 to select corresponding practices 302 with an associated DRE shown by DRE indicator 310. This DRE, along with the configurable elements of 206 are used to calculate any changes in resource shown in the resource graph, resulting in to be schedule 322 and defects removed profile 330.

At block 406, the model application 112 calculates defect removal in each of the development phases for the baseline plan and the to be plan as a function of the DRE values. The DRE indicator 310 can graphically depict the DRE values and the calculated defect removal values may appear both directly and indirectly as the various effects are plotted in FIGS. 2 and 3. The specific numerical values for the defect removal at each development stage are depicted as part of the baseline state 202 and the to be state 204 of FIG. 2. The DRE values may be scaled as percentage values and applied against the number of defects remaining in each development phase as defects are incrementally removed.

At block 408, the user of the model application 112 adjusts configuration settings for the to be plan to shift an amount of the defect removal earlier in the development phases of the to be plan as compared to the baseline plan. The shift can be in a larger amount or a smaller amount of early defect removal. For example, setting checkbox 314 selects code inspection for the to be plan and shifts a portion of defect removal from later development test 220, functional verification test 222, system verification test 224, and field support 226 phases to the code phase 218. The result is graphically illustrated at peak 330 and by difference 332 in FIG. 3. As various practices 302 are selected, the DRE values can be adjusted using the buttons 312 to adjust both specific practices in each development phase as well as the efficiency of the practices in removing defects. The baseline plan and the to be plan may be configured for defect cost per development phase, hours to remove a defect per development phase, business hours per month, and labor costs as part of the configurable settings 206.

At block 410, the model application 112 outputs a graphical representation of effects of the to be plan as compared to the baseline plan. The effects can be depicted by duration graph 232, cost graphs 234 and 236, resource graph 240, and defects removed graph 242. The results can also be written to the data storage device 106 for further analysis.

Thus, the early defect removal model graphically demonstrates the relative cost, quality and schedule duration variances among various software development practices, allowing the user to demonstrate the value of early defect removal and understand the effect of software engineering practices choices. While exemplary embodiments have been described in reference to software development, it will be understood that the term "software" applies to all types of programming, including development of firmware, microcode, millicode, and hardware description language (HDL), in addition to traditional application development using programming languages such as Java, C++, etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for modeling early defect removal, comprising:
   selecting a first set of software development practices to model as a baseline plan, wherein each of the software development practices has an associated defect removal efficiency (DRE) and is associated with development phases of a software development cycle, wherein the development phases include: requirement generation, design, code, development test, functional verification test, system verification test, and field support;
   selecting a second set of the software development practices to model as a to be plan, wherein each of the software development practices has a configurable DRE for the to be plan;
   calculating, by a computer processor, defect removal in each of the development phases for the baseline plan and the to be plan as a function of the DRE values, wherein the DRE for each of the software development practices including a default median value and is independently configurable for the baseline plan and the to be plan;
   adjusting configuration settings for the to be plan to shift an amount of the defect removal earlier in the development phases of the to be plan as compared to the baseline plan; and
   simultaneously outputting a graphical representation of effects of the to be plan as compared to the baseline plan.

2. The method of claim 1 wherein the software development practices of the requirement generation phase include use cases and requirements inspection; the software development practices of the design phase include top-level design inspection and detailed functional design inspection; the software development practices of the code phase include code inspection; the software development practices of the development test phase include unit test, static analysis, and developer integration test; the software development practices of the functional verification test phase include function test; the software development practices of the system verification test phase include system test; and the software development practices of the field support include external beta test.

3. The method of claim 1 wherein a graphical representation of expected DRE values for each of the software development practices is provided with range bands indicating expected high and low DRE values based on industry data.

4. The method of claim 1 wherein the effects include defects removed, resource allocation, cost, and duration for each of the development phases.

5. The method of claim 1 wherein the baseline plan and the to be plan are configurable for defect cost per development phase, hours to remove a defect per development phase, business hours per month, and labor costs.

6. The method of claim 1 wherein the DRE values are determined by applying pre-defined weightings to questions and user provided answers to estimate deployment effectiveness of the software development practices.

7. A computer program product for modeling early defect removal, the computer program product comprising:
   a storage medium readable by a processing circuit and storing instructions for execution by the processing circuit for implementing method , the method comprising:
      selecting a first set of software development practices to model as a baseline plan, wherein each of the software development practices has an associated defect removal efficiency (DRE) and is associated with development phases of a software development cycle, wherein the development phases include: requirement generation, design, code, development test, functional verification test, system verification test, and field support;
      selecting a second set of the software development practices to model as a to be plan, wherein each of the software development practices has a configurable DRE for the to be plan;
      calculating defect removal in each of the development phases for the baseline plan and the to be plan as a function of the DRE values, wherein the DRE for each of the software development practices including a default median value and is independently configurable for the baseline plan and the to be plan;
      adjusting configuration settings for the to be plan to shift an amount of the defect removal earlier in the development phases of the to be plan as compared to the baseline plan; and
      simultaneously outputting a graphical representation of effects of the to be plan as compared to the baseline plan.

* * * * *